United States Patent
Shaath et al.

(10) Patent No.: US 10,798,873 B1
(45) Date of Patent: Oct. 13, 2020

(54) METHOD AND APPARATUS FOR MULTI-PORT FLUID DISPENSING

(71) Applicants: Rabah Y. Shaath, Sayre, PA (US); Randall S. Litterly, Elkhart, IL (US); Douglas L. Litterly, Elkhart, IL (US)

(72) Inventors: Rabah Y. Shaath, Sayre, PA (US); Randall S. Litterly, Elkhart, IL (US); Douglas L. Litterly, Elkhart, IL (US)

( * ) Notice: Subject to any disclaimer, the term of this patent is extended or adjusted under 35 U.S.C. 154(b) by 852 days.

(21) Appl. No.: 15/206,462

(22) Filed: Jul. 11, 2016

Related U.S. Application Data

(63) Continuation-in-part of application No. 15/005,131, filed on Jan. 25, 2016, now abandoned.

(60) Provisional application No. 62/109,675, filed on Jan. 30, 2015.

(51) Int. Cl.

| | |
|---|---|
| *A01C 23/00* | (2006.01) |
| *B05B 1/30* | (2006.01) |
| *B05B 13/00* | (2006.01) |
| *A01C 21/00* | (2006.01) |
| *A01C 23/04* | (2006.01) |

(52) U.S. Cl.
CPC ............ *A01C 23/007* (2013.01); *A01C 21/00* (2013.01); *A01C 23/008* (2013.01); *A01C 23/047* (2013.01); *B05B 1/30* (2013.01); *B05B 13/005* (2013.01)

(58) Field of Classification Search
CPC ... A01C 23/007; A01C 23/047; A01C 23/008; A01C 21/00; B05B 13/005; B05B 1/30
USPC .................................................. 239/146–176
See application file for complete search history.

(56) References Cited

U.S. PATENT DOCUMENTS

| | | | |
|---|---|---|---|
| 4,458,609 A | 7/1984 | Tofte ................................. 111/7 |
| 4,637,547 A | 1/1987 | Hiniker et al. .................... 239/1 |
| 4,803,626 A | 2/1989 | Bachman et al. ........ 364/424.07 |
| 5,035,357 A * | 7/1991 | Brickell ............. A01M 7/0089 |
| | | | 239/156 |
| 5,134,961 A | 8/1992 | Giles et al. ................... 118/684 |
| 5,475,614 A | 12/1995 | Tofte et al. .................... 364/509 |
| 6,230,091 B1 * | 5/2001 | McQuinn ............. A01B 79/005 |
| | | | 239/159 |
| 6,311,716 B1 | 11/2001 | Jones ........................ 137/118.02 |
| 6,901,948 B2 | 6/2005 | Nimberger ............... 137/315.41 |
| 7,410,107 B1 | 8/2008 | Hanna et al. ................. 239/383 |
| 7,775,168 B2 * | 8/2010 | Sidhwa ................ A01C 23/002 |
| | | | 111/118 |

(Continued)

OTHER PUBLICATIONS

"PID controller," article from Wikipedia accessed online Jul. 1, 2016, from https://en.wikipedia.org/wiki/PID_controller.

*Primary Examiner* — Qingzhang Zhou
(74) *Attorney, Agent, or Firm* — Jonathan A. Bay

(57) ABSTRACT

For mobile tank fertilization of row-crop fields, methods and apparatus for improvements in multi-port fluid dispensing. The inventive methods and apparatus allow for replacement of a single regulating valve for the whole multiplicity of spray nozzles with a plurality of self-coordinating, closed-loop controlled, metering valves, but which closed-loop controllers maintain backward compatibility with existing gross flowrate control technology for the now-replaced and omitted single regulating valve. The inventive methods and apparatus can have closed-loop controlled multi-port metering valves for distributing fertilizer fluid to sub-sets of the multiplicity of nozzles, or else a dedicated single closed-loop controlled metering valve for every single one of the nozzles.

6 Claims, 12 Drawing Sheets

(56) References Cited

U.S. PATENT DOCUMENTS 8,622,253 B1    1/2014   Litterly et al. ................ 222/230
2013/0153676 A1*  6/2013   Ballu ................... A01C 23/007
                                                     239/11

* cited by examiner

METHOD AND APPARATUS FOR MULTI-PORT FLUID DISPENSING

CROSS-REFERENCE TO RELATED APPLICATION(S)

This application is a continuation-in-part of U.S. patent Ser. No. 15/005,131, filed Jan. 25, 2016, which claims the benefit of U.S. Provisional Application No. 62/109,675, filed Jan. 30, 2015. The foregoing patent disclosures are incorporated herein by this reference thereto.

BACKGROUND OF THE INVENTION

The invention relates to mobile tank fertilization of row-crop fields and, more particularly, to control methods and apparatus for multi-port fluid dispensing.

The inventorship hereof includes the inventors of U.S. Pat. No. 8,622,253—Litterly et al., entitled "ANHYDROUS AMMONIA FERTILIZER METERING AND DISTRIBUTION APPARATUS AND METHOD," the disclosure of which is incorporated in full herein by this reference thereto.

FIGS. 1 through 3 show farm equipment configured as a mobile tank fertilization system 502 for fertilizing row-crop fields. A tractor 504 pulls a pair of farm implements that are towed behind the tractor 504 in series (and not parallel to each other), namely:—a disc cultivator 510, and, a mobile tank trailer 512 carrying a supply tank 514 (or plural supply tanks 514, as shown here) of a selected fertilizer fluid.

Preferred fertilizer fluids for mobile tank fertilization of row-crop fields include without limitation anhydrous ammonia (NH3), as well as anhydrous ammonia and/or ammonia solutions, emulsions, suspensions and so on.

Disc cultivators 510 are characterized by having a laterally extending toolbar 520 propped up on tires 522 (four shown here) and from which are suspended a multiplicity of discs 524 laterally-spaced apart from one another to track in parallel rows 526. Disc cultivators 510 typically used for mobile tank fertilization of row-crop fields might have anywhere between eight (8) to thirty-two (32) laterally-spaced apart discs 524, thereby ranging between eight (8) to thirty-two (32) rows-wide. The rows 526 are typically evenly spaced apart. If the rows 526 are thirty (30) inches wide, then a thirty-two (32) row-wide disc cultivator 510 is going to be seventy-seven and half (77.5) feet wide, but effectively fertilizing an eighty (80) foot wide swath of ground.

Larger cultivators are known in the prior art. But the non-limiting example of a cultivator 510 shown in the drawings here will be a thirty-two (32) row wide disc cultivator 510 (ie., just for the sake of an example). But as an aside, thirty-two (32) row-wide disc cultivators are still regarded these days as big ones.

Now to turn to FIG. 6, it is a schematic diagram showing a conventional prior art way to control fluid dispensing for mobile tank fertilization of row-crop fields. The supply tanks 514 feed a selected fertilizer fluid to a main feeding conduit or hose 532. The main feeding conduit 532 or hose in turn feeds the fertilizer fluid to a liquid conditioning system 534. In the case of anhydrous ammonia, the conditioning system 534 serves to eliminate gaseous phase anhydrous ammonia just prior to being input to a flowmeter 536. Typical flowmeters used these days give the best results if the throughput fluid is liquid phase only. The conditioning system 534 typically eliminates the vapor phase by any of numerous techniques, including condensing the vapor by refrigeration, separating the vapor, pressurizing the fluid and so on.

The conditioning system 534 outputs the fertilizer fluid in substantially a liquid phase to the flowmeter 536, which provides a control signal output (eg., an electronic and/or data signal, etc.) corresponding to a gross flowrate.

In the case of anhydrous ammonia, once again, it is preferred to keep the anhydrous ammonia liquified through the flowmeter 536. This is largely achieved through refrigeration and/or separation. At atmospheric pressure, the boiling point for anhydrous ammonia is −28.8° F.

The opposite way to reckon above is that, at the temperature of −28.8° F., a farmer must keep anhydrous ammonia in a container that is pressurized to at least one atmosphere, and not a vacuum, or else the anhydrous ammonia will vaporize. However, perhaps no farmer undertakes mobile tank fertilization of row-crop fields at such an Arctic temperature. Below is a TABLE which gives more useful representative temperatures and pressures of the boiling point for anhydrous ammonia for the climatic temperatures that farmers more ordinarily deal with.

TABLE

| Boiling Point (° F.) vs. Pressure (psig) of Anhydrous Ammonia | |
|---|---|
| Boiling Point (° F.) | Pressure (psig) |
| −28.8 | 0 |
| 34 | 50 |
| 70 | 140 |

The single disc 524 shown in FIG. 3 of the disc cultivator 510 is representative of all thirty-two (32) discs 524 in this thirty-two (32) disc-wide disc cultivator 510. Each disc 524 has a spray nozzle 540 associated with it. The spray nozzle 540 is fed a some fractional proportion of the gross flowrate of fertilizer fluid that flows through the flowmeter 536.

Returning to FIG. 6, and in accordance with the prior art, the flowmeter 536 outputs to typically a single regulating valve 544. The single regulating valve 544 is controlled by a prior art control system 550 (not indicated, but, typically located in the cab of the tractor 504). A farmer typically selects a selected gross application rate according to pounds of fertilizing fluid per acre. Older prior art control systems 550 provided the farmer with a keyboard or keypad or the like as a user interface. Newer prior art control systems 550 typically provide a touch screen as a user interface (no user interface is shown here).

Typically gross application rates range between and without limitation one-hundred fifty (150) and two hundred (200) pounds of fertilizer fluid per acre. The prior art control systems 550 are also able to receive a signal or data input corresponding to the speed of the tractor 504. If the farmer selects a gross application rate of two-hundred (200) pounds per acre, and drives five (5) miles per hour covering an eighty (80) foot wide swath per pass, the prior art control systems 550 can figure the following (albeit in perhaps different units and/or a different sequence of steps).

The disc cultivator 510 is going to cover approximately forty-eight and a half (48.48) acres an hour. The gross application rate will therefore be 9,696 pounds per hour (or 161.6 lbs/min). The prior art controller functions to control the sole regulating valve 544 by control signals thereto, to achieve the following:—namely, that the regulating valve 544 is adjusted until the (relatively) steady state gross flowrate of the fertilizer fluid is close to being 161.6 lbs/min.

The prior art control system 550 adjusts the sole regulating valve 544 until the target gross application rate is achieved, and then more or less idles. The prior art control system 550 typically will not stir out of idle until the farmer slows down or speeds up, or otherwise shuts the flow OFF to execute a turn.

Given the foregoing, and studying FIG. 6 a little further, the following shortcomings can be understood with this prior art configuration of multi-port fluid dispensing.

The fluid output from the sole regulating valve 544 is distributed to a thirty-two (32) port manifold 552. Thirty-two (32) lines 554 of row tubing extend between an inlet/inner end connected to one respective outlet port of the manifold 552 and an outlet/outer end connected to one respective spray nozzle 540 associated with one respective disc 524 of the thirty-two (32) disc-wide disc cultivator 510.

Thus the gross-application flowrate of the flowmeter 536 is distributed to the thirty-two (32) spray nozzles 540 this way. The row tubing 554 to the lateral left and right furthest outboard spray nozzle 540 will be at least forty (40) feet in length, and probably ten to twenty-five percent longer. Conversely, the length of the row tubing 554 to the two (2) most central spray nozzles 540 might be served by row tubing lines 554 which are just as short as three (3) feet in length.

Assuming the row tubing lines 554 are flexible hoses in part all of the same diameter, the pressure drop in the longest row tubing lines 554 is going to be considerably greater than the shortest row tubing lines 554.

It has been a shortcoming of the prior art to achieve a relatively equally proportionate flowrate out of all of thirty-two (32) spray nozzles 540, corresponding to a one-thirty second (1/32nd) proportion of the gross flowrate rate. When it comes to the row tubing 554 shown in FIG. 6, the line pressure in the row tubing at the manifold 552 outlet ports are all likely to be fairly equal. In contrast, the line pressure at the central two (2) spray nozzles 540 are likely to be a lot higher than the line pressure at the spray nozzles 540 for the outboard-most spray nozzles 540. This is because the central most spray nozzles 540 have row tubing lines 554 which are only three (3) feet long or so, while the outboard-most nozzles 540 have row tubing lines 554 which are likely fifteen (15) to twenty (20) times longer.

Presumptively, all the row tubing lines 554 have a fairly equal inlet pressure:—and this can be reckoned as corresponding to a MOTIVATING pressure, or something akin to an available force to motivate the fertilizer fluid to the respective spray nozzle 540. The longer row tubing lines 554 are going to be robbed to a much greater degree of the inlet pressure (eg., the MOTIVATING pressure) than the shorter row tubing lines 554.

It is believed that line length is proportionate to the degree which the MOTIVATING pressure at the inlet/inner ends of the row tubing lines 554 is going to be "robbed" (decreased) when line pressure is measured at the spray nozzle 540.

The laterally outer nozzles 540 will spray fertilizer fluid with lower line pressures than the inner nozzles 540. Output flowrate for each nozzle 540 is proportional to line pressure at the spray nozzle 540. The proportion corresponds to a power factor of between one-half (½) and two-thirds (⅔rds) of the line pressure to the spray nozzle flowrate.

Accordingly, for the sixteen (16) nozzles 540 on the left half of the cultivator 510, the flowrate of fertilizer fluid being sprayed out of each nozzle 540 will not likely be equal. Each nozzle 540 from the central-most to the outer-most will likely spray some fractional amount less than its inner neighbor. The sixteen (16) nozzles 540 on the right half of the cultivator 510 will likely mirror image their counterparts on the left half.

Hence here is the problem. In use, the disc cultivator 510 of FIG. 6 is towed back and forth across a field, one pass in one direction, with the next pass right beside it in the opposite direction, and so on. The disc cultivator 510 of FIG. 6 is served by a fluid dispensing control system 550 in accordance with the prior art (and as described above). The center rows 526 of each pass will receive a greater proportion of the gross application rate of the fertilizer fluid than the outer rows 526. Again, the center rows 526 will receive a heavier application of fertilizer fluid than the outer rows 526, will receive a thinner application. If the row crop is corn, the seed landing in the center rows 526 will yield bigger plants producing more kernels at earlier maturity times than plants in the outer rows 526, which might even stunt or wilt (ie., yield zero to little).

Accordingly, what is needed is an improvement over the prior art.

SUMMARY OF THE INVENTION

It is an object of the invention to be able to equalize the dispensing flowrate among a multiplicity of outlet ports (ie, spray nozzles) for a mobile tank fertilization system of row-crop fields.

But in contrast, it is a co-equal object of the invention to be able to provide individual control over each dispensing flowrate among the multiplicity of spray nozzles.

It is another object of the invention to provide a mobile tank row-crop field fertilizing system with a plurality (ie., a small population) of multiple outlet port (multi-port) metering valves, or else in contrast, with a multiplicity (ie., a numerous population) of single-nozzle metering valves.

It is alternate object of the invention to provide coordinated and/or concurrent control of the plurality of multi-port metering valves and/or the multiplicity of single-nozzle metering valves.

It is a further object of the invention to be able to equalize the outflow among the multiplicity of spray nozzle by using a closed loop control system that monitors line pressure in the row distribution lines adjacent to (or inside of) the metering valve, whether if one of the plurality of multi-port metering valves and/or one of the multiplicity of single-nozzle metering valves.

It is an additional object of the invention to shorten the lengths of the longest spans of the row tubing seen in the prior art.

It is still another object of the invention is to improve control stability over the metering valves at low application rates of the fertilizer fluid (ie., at low flowrates, and low line pressures at the spray nozzles, control instructions must be smoothed and/or conditioned to avoid stability problems).

It is still a further object of the invention to configure the metering valve control systems in accordance with the invention such that none are unstable when converging from a hold or shut-off status (ie., zero flowrate, and zero line pressure in the row tubing) to a target line pressure, as well as adjusting from one target line pressure to a succeeding and different target line pressure.

It is yet another object of the invention to reduce the convergence time from hold or shut-off status (ie., zero flowrate, and zero line pressure in the row tubing) to a target line pressure, with minimal to moderate overshoot but with exceptional stability at remaining on the target line pressure.

These and other objects and aspects of the invention are provided in a control method and apparatus in accordance with the invention that is configured with a plurality of multi-port metering valves, or a multiplicity of single-nozzle metering valves.

The inventive control method and apparatus are configured to utilize a prior art input signal as being an outer control loop, while the control improvements in accordance with the invention function as an inner control loop thereto (see, eg, FIG. 10).

A controller configured with control methods and apparatus in accordance with the invention for a plurality of multi-port metering valves comprise without limitation the following: —(a1) an execution device (eg., a micro-controller); (a2) analog-to-digital conversion circuit(s); (a3) network interface(s); (a4) actuator driver(s); and (a5) discrete logic interface(s).

The controller is configured to output not only flow metering control signals but also, and without limitation, ON/OFF signals. The controller samples the output of one or more (b) pressure sensors located on one or more of the flow outlets of multi-port metering valves. That is, there is preferably at least one pressure sensor connected at the inlet of one run row tubing line per each multi-port metering valve.

It is another aspect of the invention that the control over the plurality of multi-port metering valves is distributed among a plurality of controllers in accordance with the invention, each with its own executable device (eg., micro-controller).

These plurality of controllers are preferably interconnected with one another via (c) networking means. Each of the plurality controllers does the following, it controls the multi-port metering valve to which is attached, to do the following (d) control the respective multi-port metering valve's flowrate according to the local feedback of the local pressure sensor measure of local line pressure at the ports.

This feedback among controllers is preferably shared among all over the communications network.

It is a further aspect of the invention that all of the plurality of controllers are configured substantially identically. However, it is still another aspect of the invention that one of the plurality of the controllers in accordance with the invention assumes a lead roll. All of the plurality of controllers are configured to assume the role as "lead" controller. However, in any given configuration, one is assigned that role. An example of an arbitrary assignment of the role can be the controller among the plurality which directly receives the signal instructions from the prior art controller in the tractor cab.

Hence in this configuration, the control method an apparatus as configured here can be reckoned as at least three (3) embedded loops, wherein:—
1—the outer control loop is governed by the prior art controller typically located in the tractor cab;
2—the intermediate control loop is governed by an assigned one of the plurality of controllers in accordance with the invention, which are all typically disposed with each one's respective one of the multi-port metering valves typically disposed on the toolbar of the cultivator, whereby the assigned one of the plurality of controllers in accordance with the invention takes a lead role and provides control coordination at a low speed sampling rate; and
3—a plurality of inner control loops governed individually by each one of the plurality of controllers in accordance with the invention that are typically disposed with each one's respective one of the multi-port metering valves typically disposed on the toolbar of the cultivator, whereby each one of the controllers of doing functions for their own individual inner control loop service do so at high low speed sampling rates.

The "lead" controller in accordance with the invention computes the target pressure set-point according to the signal provided by the prior art controller from the cab of the tractor. The conventional prior art controller is wired with three wires:—two of which provide an input signal of UP (more) or DOWN (less) gross flowrate, as well as indication of proportionally how much more up or down (eg, the width of a pulsed signal, or, pulse width). The third wire typically provides the simple Boolean instruction of ON or OFF (eg, run, or, shut-off).

Each controller (or the "lead" controller) may do something else. Each (it) might limit the change instruction as a difference function to the furthest apart pressure value associated with any operating multi-port metering valves.

It a further aspect of the invention that a method and a system for NH3 row crop applications allows the replacement of a single metering valve system with a plurality of self coordinating multi-port metering valves while maintaining compatibility with existing generic NH3 rate controllers.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
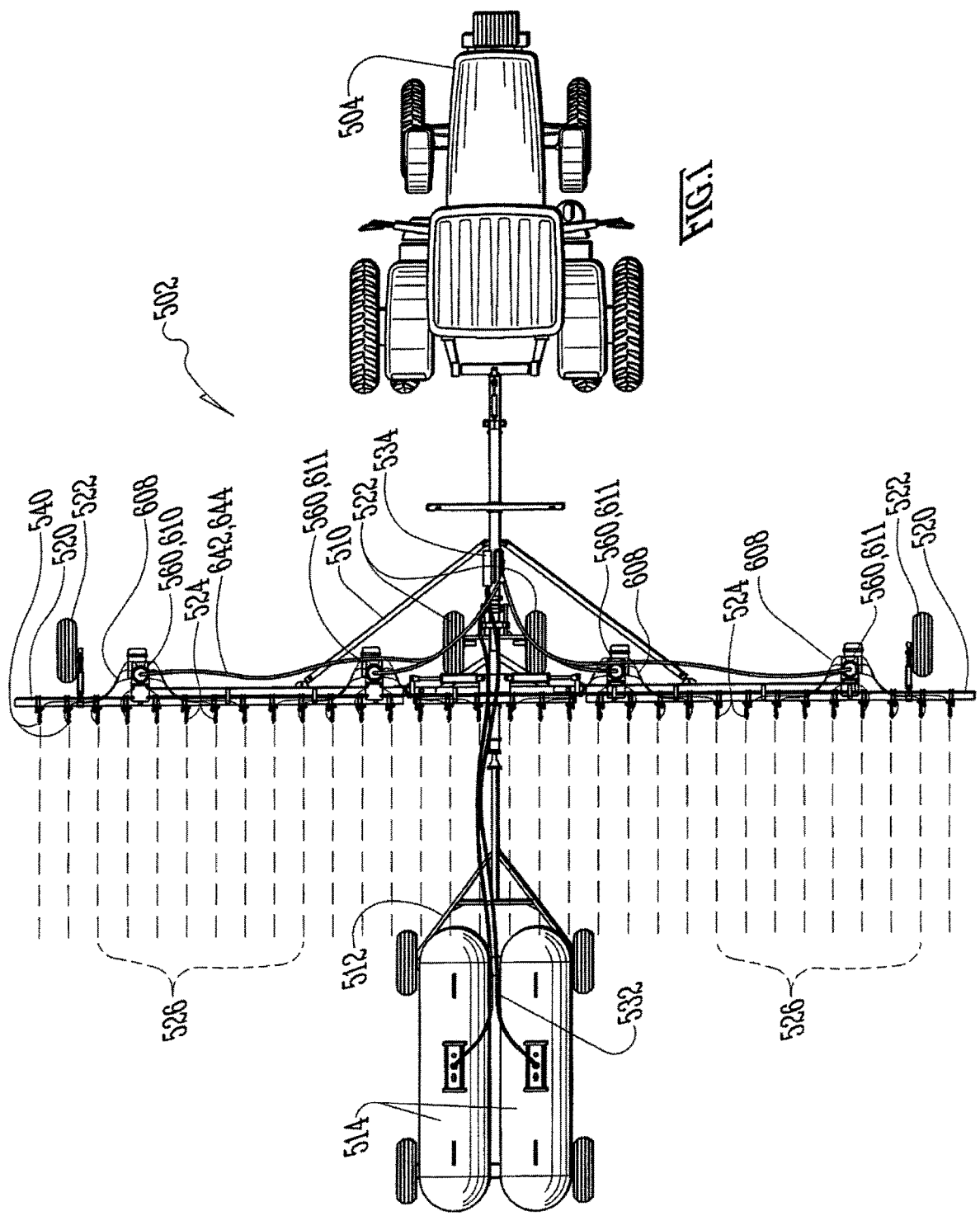
FIG. 1 is a top plan view of a mobile tank fertilization system for row-crop fields, and, configured with improvements in control over multi-port fluid dispensing in accordance with the invention, wherein the disc cultivator is shown on a reduced scale relative to the tractor.
Figure 2:
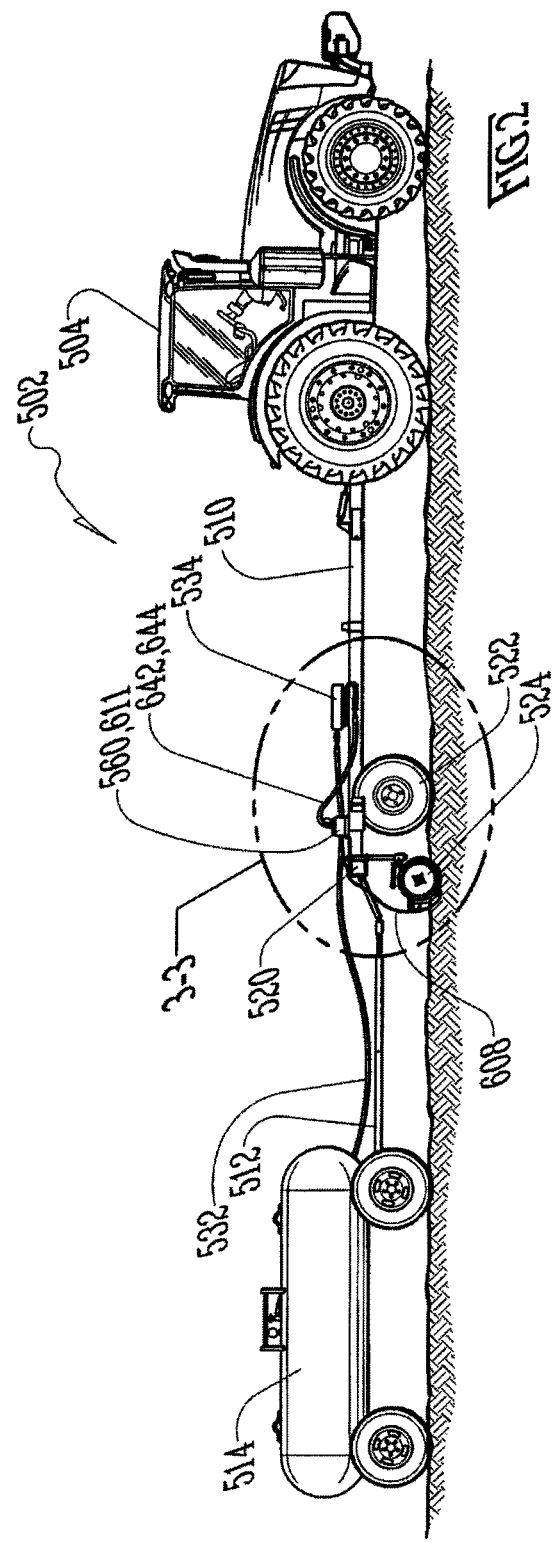
FIG. 2 is a side elevational view thereof.

FIG. 1 shows a mobile tank fertilization system 502 for row-crop fields that is configured with apparatus and methods in accordance with the invention for multi-port fluid dispensing.

Figure 6:
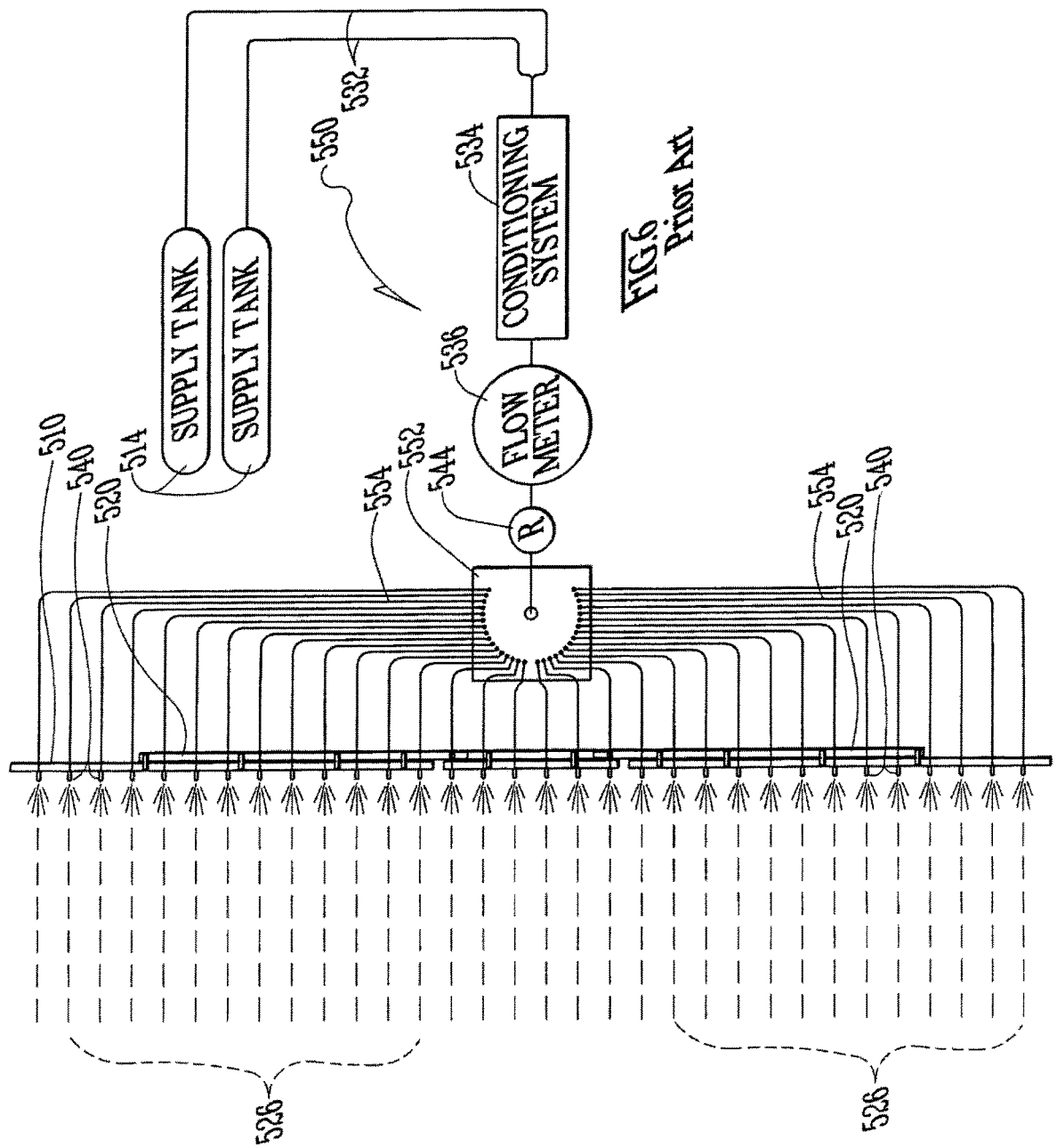
FIG. 6 is a top plan view comparable to FIG. 1 except in accordance with the prior art and being a schematic diagram of the fluid flow lines of fertilizer product from tank(s) to nozzles.

FIG. 1 shows several things in contrast to FIG. 6. In FIG. 6, the cultivator 510 has only a single regulating valve 544. In FIG. 1, the cultivator 510 has a plurality of metering valves. More particularly, in this example, the cultivator 510 has four (4) metering valves, each serving eight (8) nozzles 540 per valve 560.

Figure 3:
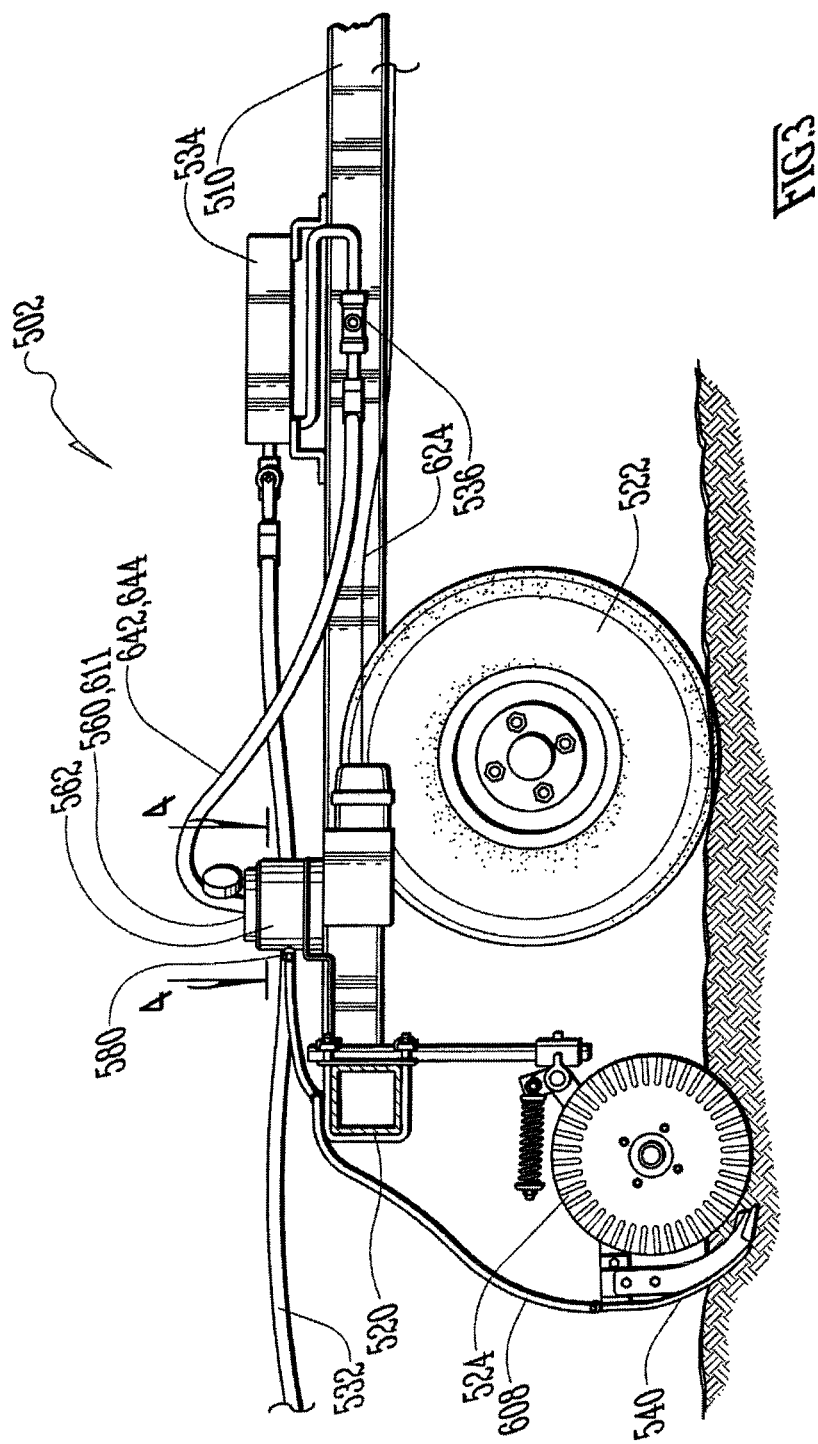
FIG. 3 is an enlarged-scale elevational view of detail 3-3 in FIG. 2.

These metering valves are not just simple metering valves because, they are also multi-port distributors as well. FIG. 3 shows one such multi-port metering valve 560 mounted to the tool bar. Mounted on top of the valve is a housing 562 containing an electric drive actuator (comprising a control system indicated as 610 and/or 611 in the block diagrams of FIGS. 9,10 and 12; as well as a drive motor, reduction gearing and so on indicated as 602 also in the block diagrams of FIGS. 9,10 and 12).

Figure 4:
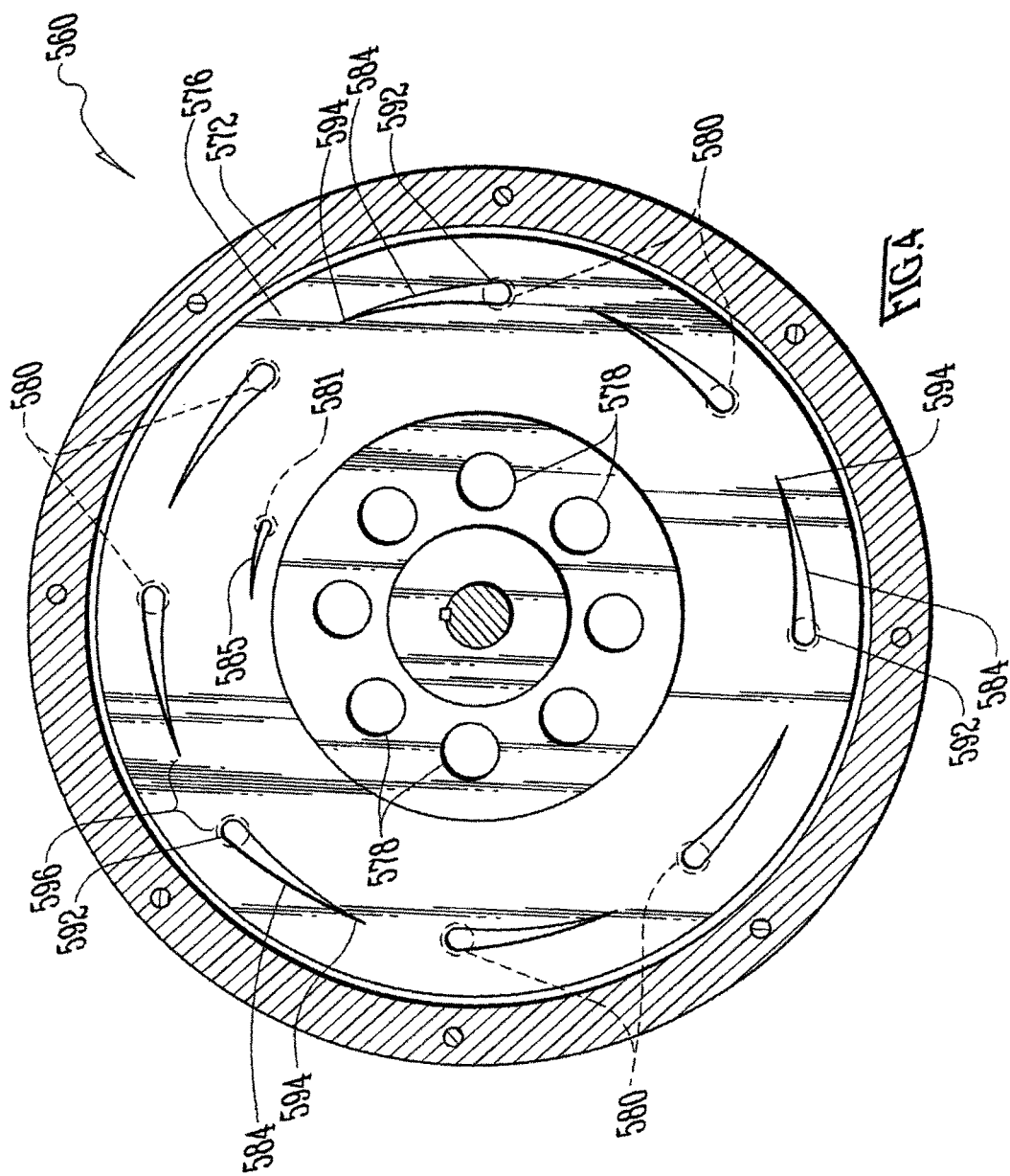
FIG. 4 is an enlarged-scale section view taken through line 4-4 in FIG. 3.
Figure 5:
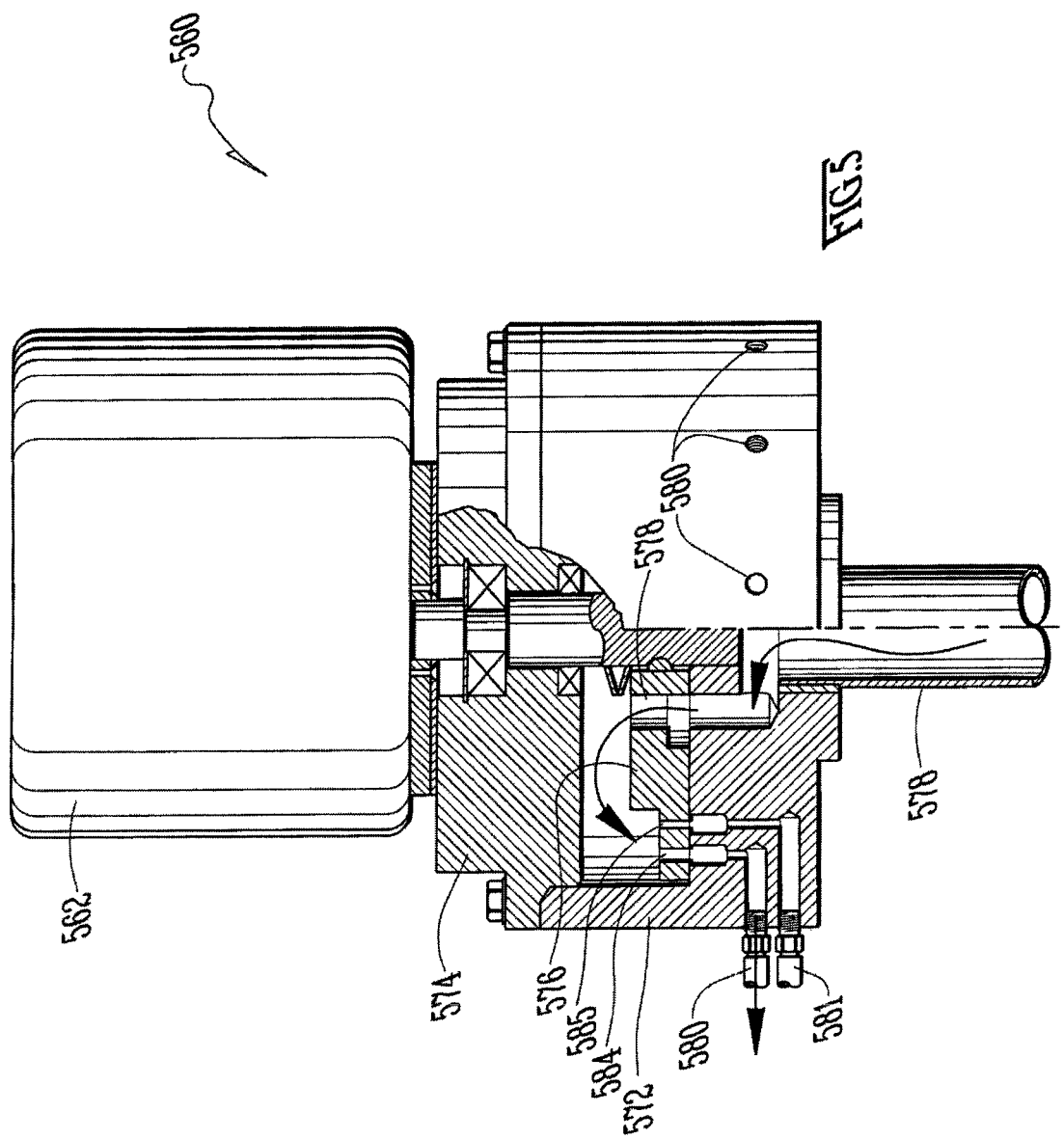
FIG. 5 is a side elevational view, partly in section, of FIG. 4.

FIG. 4 is an enlarged-scale section view taken through line 4-4 in FIG. 3. FIG. 5 is a side elevational view, partly in section, of FIG. 4. This multi-port metering valve 560 has a bowl-shaped body 572 capped by a lid 574, together which enclose a rotationally adjustable metering dial 576. The fluid inlet for the valve is an inlet port 578 in the center of the bottom of the bowl-shaped body 572.

This multi-port metering valve 560 has nine (9) outlet ports 580-81. FIG. 5 shows two (2) of the nine (9) outlet ports 580-81. FIG. 4 shows all nine (9) outlet ports 580-81. A valve 560 of this design can be provided with numerous more outlet ports, but this nine (9) port version is shown for example and without limitation.

In FIG. 4, all nine (9) outlet ports 580-81 are circular and are formed in the bottom and sidewall of bowl-shaped body 572 of the valve 860. The rotationally adjustable metering dial 576 has nine (9) tear-dropped shaped apertures 584-85, with each such aperture 584-85 being paired (or coordinated) with a corresponding one of the nine (9) ports 581-81. Each tear-dropped aperture 584-85 has a bulbous closed end 592 at the clockwise extreme, and extends from there (narrowing along the way) to a sharply-pointed closed end 594 at the counter-clockwise extreme.

Eight (8) of the ports 580 and tear-dropped shaped apertures 584 are disposed on a common (major) diameter. The ninth (9th) port 581 and aperture 585 are disposed on their own independent diameter, which is inside the major diameter for the other eight (8) ports 580 and apertures 584. For the eight (8) teardrop-shaped apertures 584 on the major diameter, there is about fifteen arc degrees (15° arc) of solid material 596 between the pointed closed end 594 of a given aperture 584 and the bulbous closed end 592 of the aperture 584 counter-clockwise from said given aperture 584.

Adjusting the metering dial 576 reversibly between clockwise and counter-clockwise extremes provides the flowrate metering function of the valve 560. In FIG. 4, the metering dial 576 is turned to its counter-clockwise extreme, where the bulbous closed end 592 of each tear-dropped aperture 584-5 is co-axial with the port 580-81 it cooperates with. This position as shown in FIG. 4 for the metering dial 576 corresponds to the WIDE OPEN extreme for flowrate.

Rotating the metering dial 576 about thirty-seven and a half arc degrees (37.5° arc) clockwise has each outlet port 580 covered by the about fifteen arc degrees (15° arc) of solid material 596 between the pointed closed end 594 of a given coordinated aperture 584 and the bulbous closed end 592 of the aperture 584 counter-clockwise from said given coordinated aperture 584.

The ninth (9th) port 581 and 585 cooperate accordingly in this dial position such that the ninth (9th) is closed too. This dial position (which is not shown) corresponds to the CLOSED extreme for the valve 560. Rotationally adjusting the metering dial 576 between the WIDE OPEN extreme and CLOSED extreme represents flowrate control between 100% and 0% over about a thirty-seven and a half arc degree (37.5° arc).

A reversible, gear-reduced drive motor (indicated schematically in FIGS. 9 and 10) drives the metering dial 576. In a preferred but non-exclusive embodiment for the invention, the gear reduction between the drive motor and the rotationally adjustable metering dial 576 has about two to three hundred (200 to 300) revolutions of the drive motor rotating the metering dial 576 between the WIDE OPEN and CLOSED extreme (eg., about (37.5° arc).

The ninth (9th) outlet port 581 on the minor diameter and its cooperating metering aperture 585 serve a special function. The other eight (8) outlet ports 580 and metering apertures 584 on the major diameter are produced carefully to be the same size. Thus if the metering dial 576 is adjusted to halfway between the WIDE OPEN and CLOSED extremes, the flowrate issuing through the effective outlet aperture for each outlet port 580 should be just about equal to within a small error. Again, the flowrates among all eight (8) ports 580 on the major diameter should be equal no matter the adjusted position of the dial 576 between the WIDE OPEN and CLOSED extremes.

The ninth (9th) outlet port 581 on the minor diameter and its cooperating metering aperture 585 are sized and proportioned to allow a through-flow that is proportioned to being (as close to exact as practical) one-half (½) of the flowrate through each of the other eight (8) outlet ports 580 and metering apertures 584 on the major diameter. That way, given a thirty-two (32) disc-wide disc cultivator 510, the outboard-most left and right nozzles 540 can be plumbed to the half rate outlet ports 580.

That way, a farmer can fertilize a field with the following driving pattern. The farmer can make a driving pass on a straight East course with the Northernmost spray nozzle 540 spraying at a half of the target flowrate of the inner thirty (30) nozzles 540, but equal with the Southernmost spray nozzle 540. The farmer can turnaround at the end of the Eastward pass and make a succeeding Westward pass, just immediately North of the previous Eastward pass. On this pass, the farmer will run the Southernmost disc 524 through the row 526 furrowed by the Northernmost disc 524 on the previous pass. Since this row 526 will receive two applications from the spray nozzle 540 on the outboard-most extreme of the cultivator 510, the metering valve 560 has the geometry of this outlet port scaled to throttle the flowrate to one-half of the interior thirty (30) nozzles 540.

In the above example, the lateral left outboard-extreme nozzle 540 was in the Northernmost extreme row 526 on the Eastward pass. It will be tracking in the same row 526 in the Westward pass when it is then in the Southernmost extreme row 526 on the Westward pass. In any event, two passes at half the target flowrate for that row 526 will equal the application rate of the inner thirty (30) nozzles 540 dispensing at the target rate.

Figure 7:
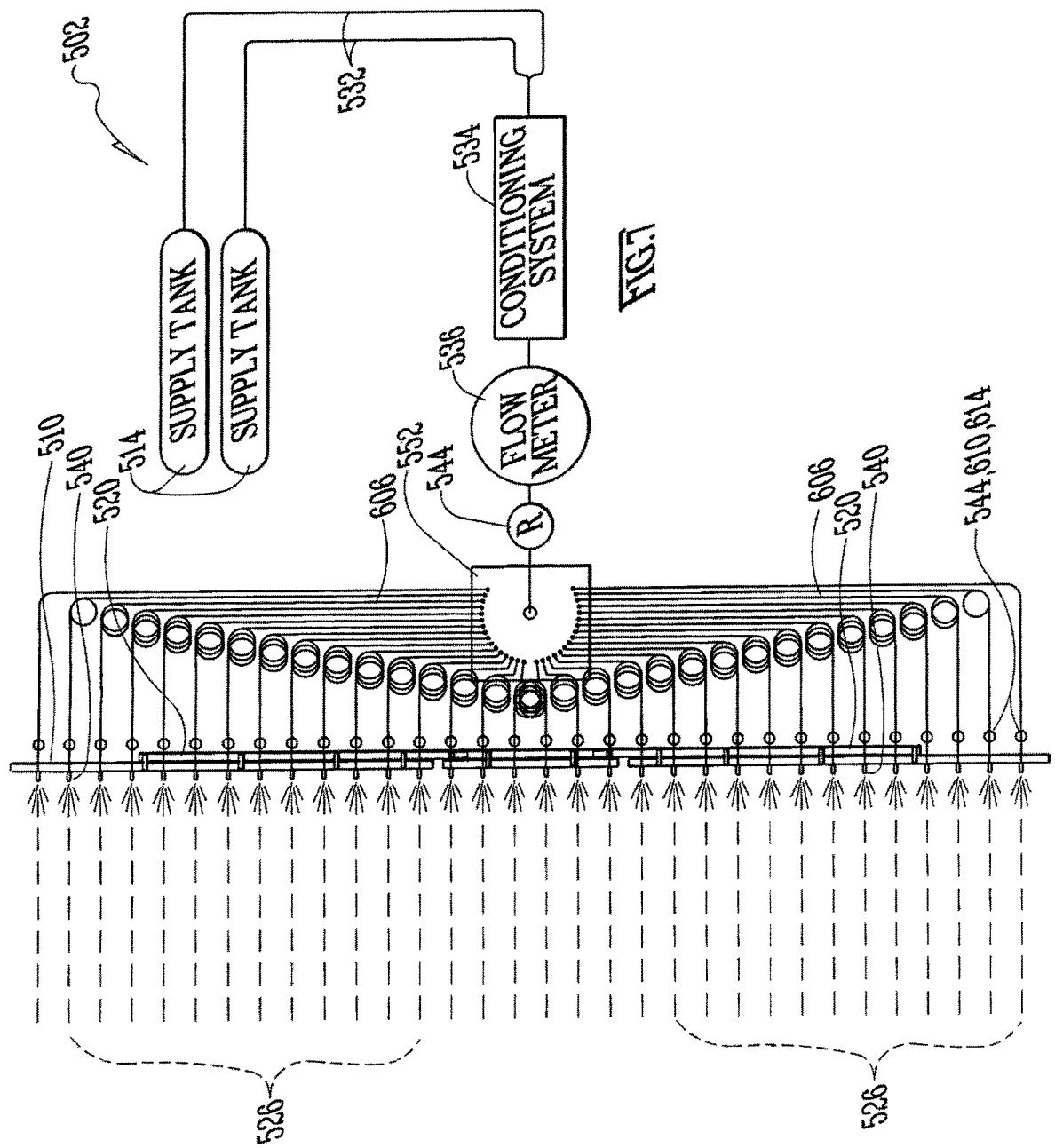
FIG. 7 is a top plan schematic diagram comparable to FIG. 6 except showing one improvement in accordance with the invention.

FIG. 7 shows an improvement in accordance with the invention, which is an improvement over FIG. 6. In FIG. 7, each of the thirty-two (32) row tubing lines 606 is of equal length. That is, each is about forty-five (45) feet in length. For the central nozzles 540, the excess length is just coiled in coils that are hung from the toolbar 520. Making all the row tubing lines 606 of equal length should make the pressure drop from the manifold 552 to each nozzle 540 to be about equal. In other words, the individual flowrate through each nozzle 540 should be about the same for all the nozzles 540.

Figure 8:
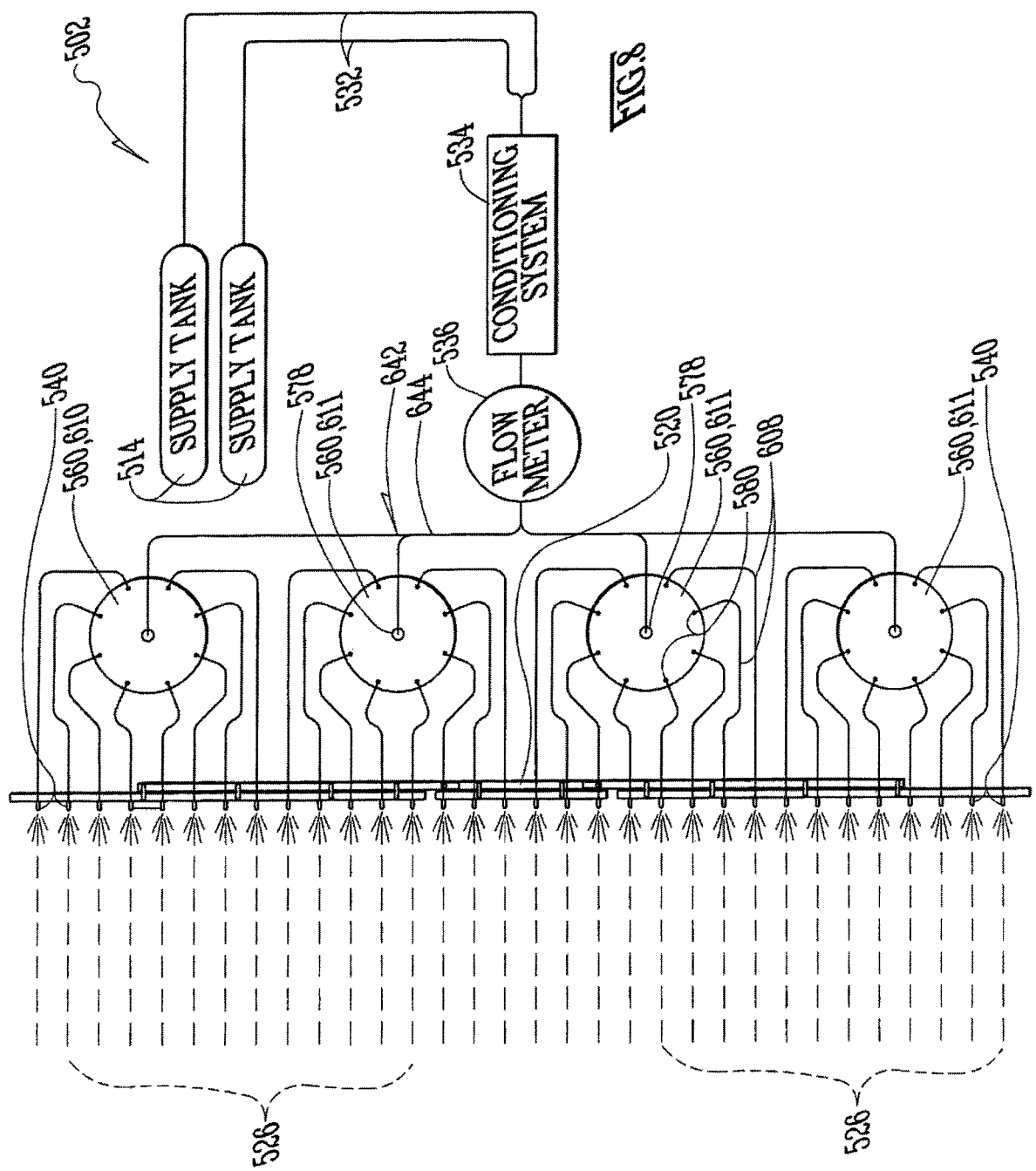
FIG. 8 is a top plan schematic diagram comparable to FIGS. 6 and 7 except showing a further improvement in accordance with the invention.

However, the configuration of FIG. 1 is more preferred still. FIG. 8 is a schematic diagram counterpart illustration of the FIG. 1 cultivator 510, and showing the four (4) multi-port metering valves 560s which serve eight (8) nozzles 540 each. As FIG. 8 shows better, the row tubing lines 608 for all eight (8) nozzles 540 of each multi-port metering valve 560 are equal in length. That way, if each row tubing line 608 is pressurized at the inlet to a common pressure, and the lumen geometry is equal and the line length is equal, then (a) there should be a common pressure drop across all eight row tubing lines 608 and (b) in consequence, an equal flowrate dispensing out all eight (8) nozzles 540. Provided of course, that none of the eight nozzles 540 is plumbed to the ninth ($9^{th}$) port in the metering valve, which corresponds to the half-flowrate option.

It is even furthermore preferred that the uniformity row-tubing geometry and length extend not just among the eight (8) lines of one of the four valves 540, but across all thirty-two (32) row tubing lines 608 for the cultivator 510 as a whole. It is additionally preferred if the uniformity extends to all four (4) metering valves.

Figure 9:
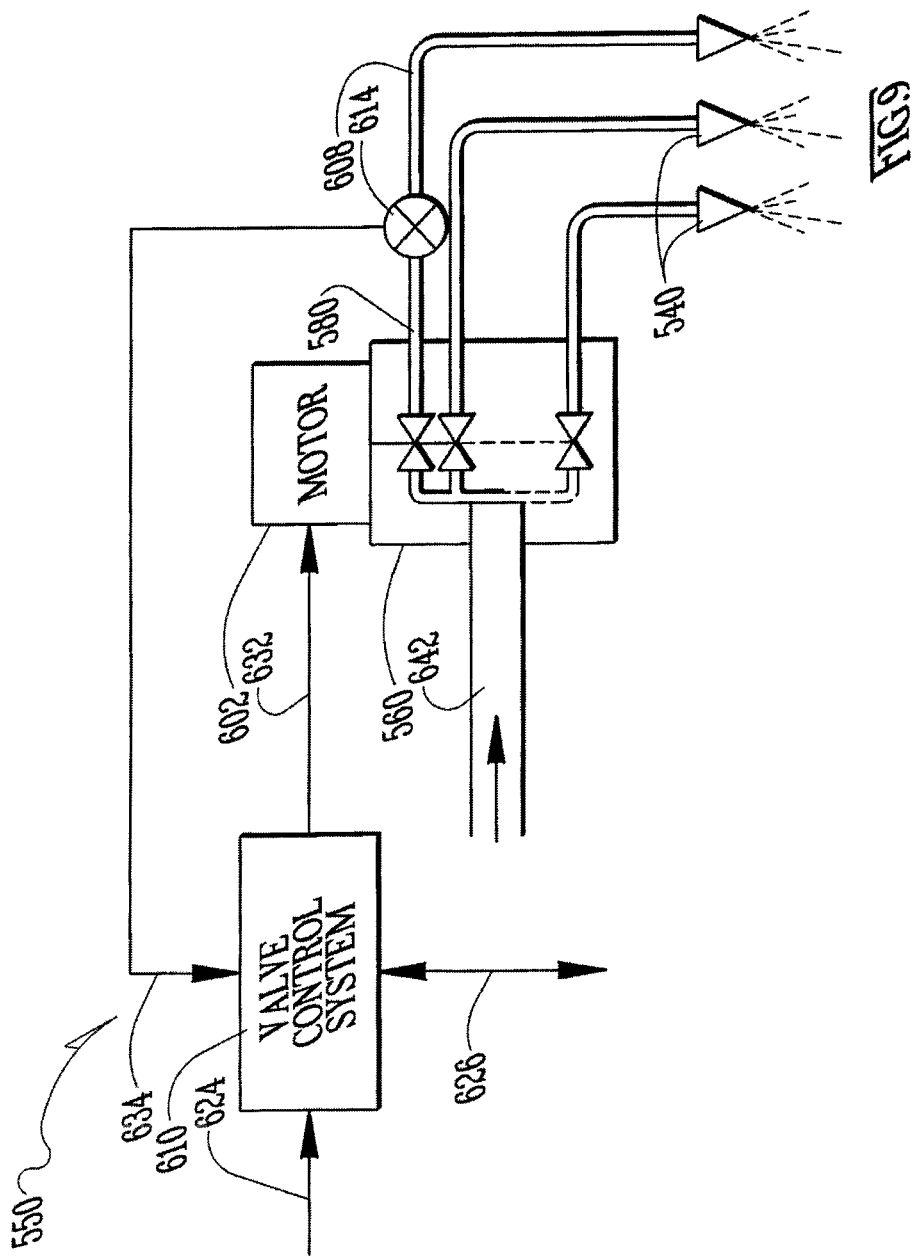
FIG. 9 is a block diagram showing a single controller in accordance with the invention coupled with a single multi-port metering valve.
Figure 10:
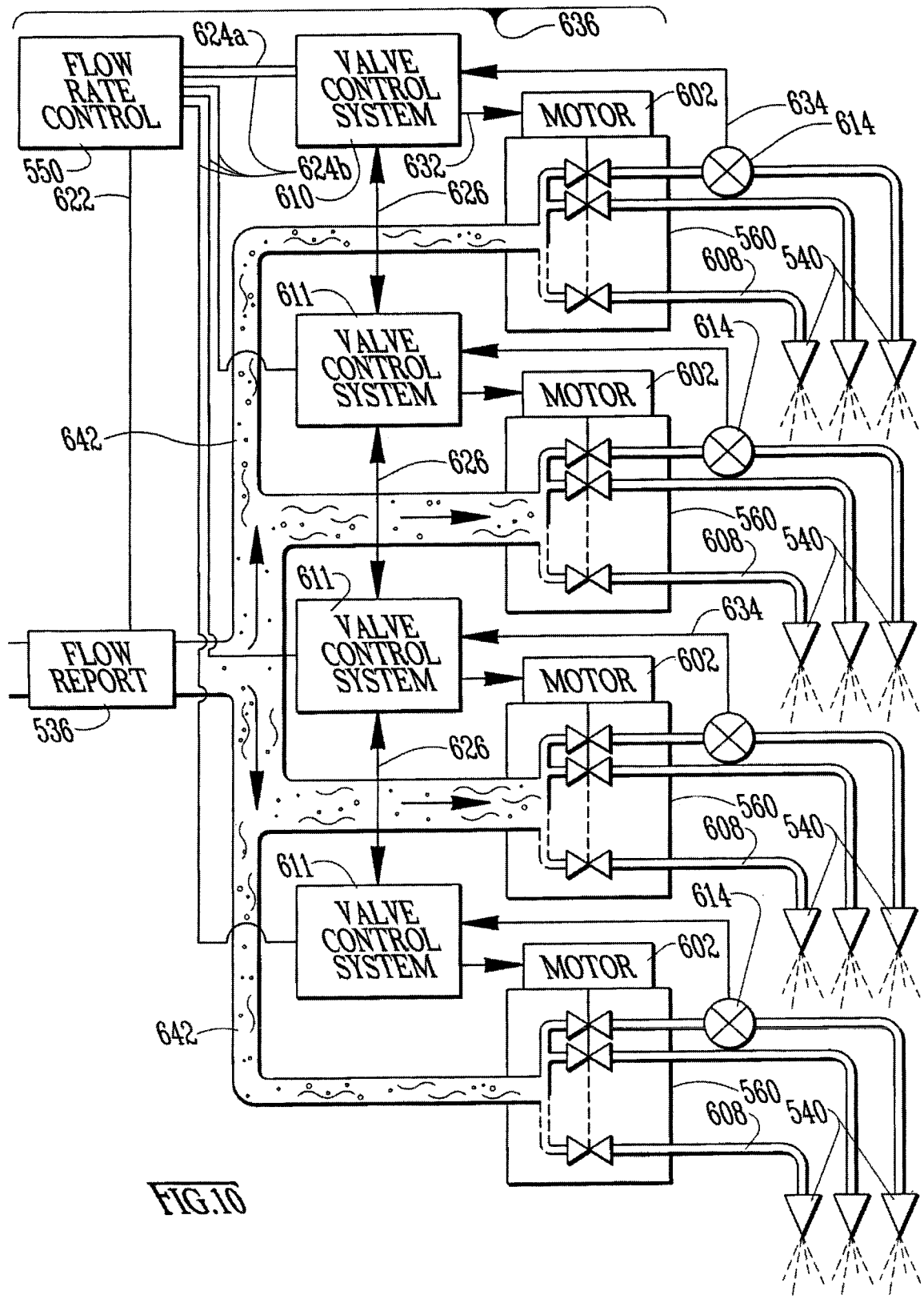
FIG. 10 is a block diagram comparable to FIG. 9 except showing a prior art outer control loop controlling a plurality of inner control loops in accordance with the invention, and further allowing the possibility of an intermediate control loop in accordance with the invention establishing itself between the prior art outer loop and the plurality of inventive inner loops.
Figure 12:
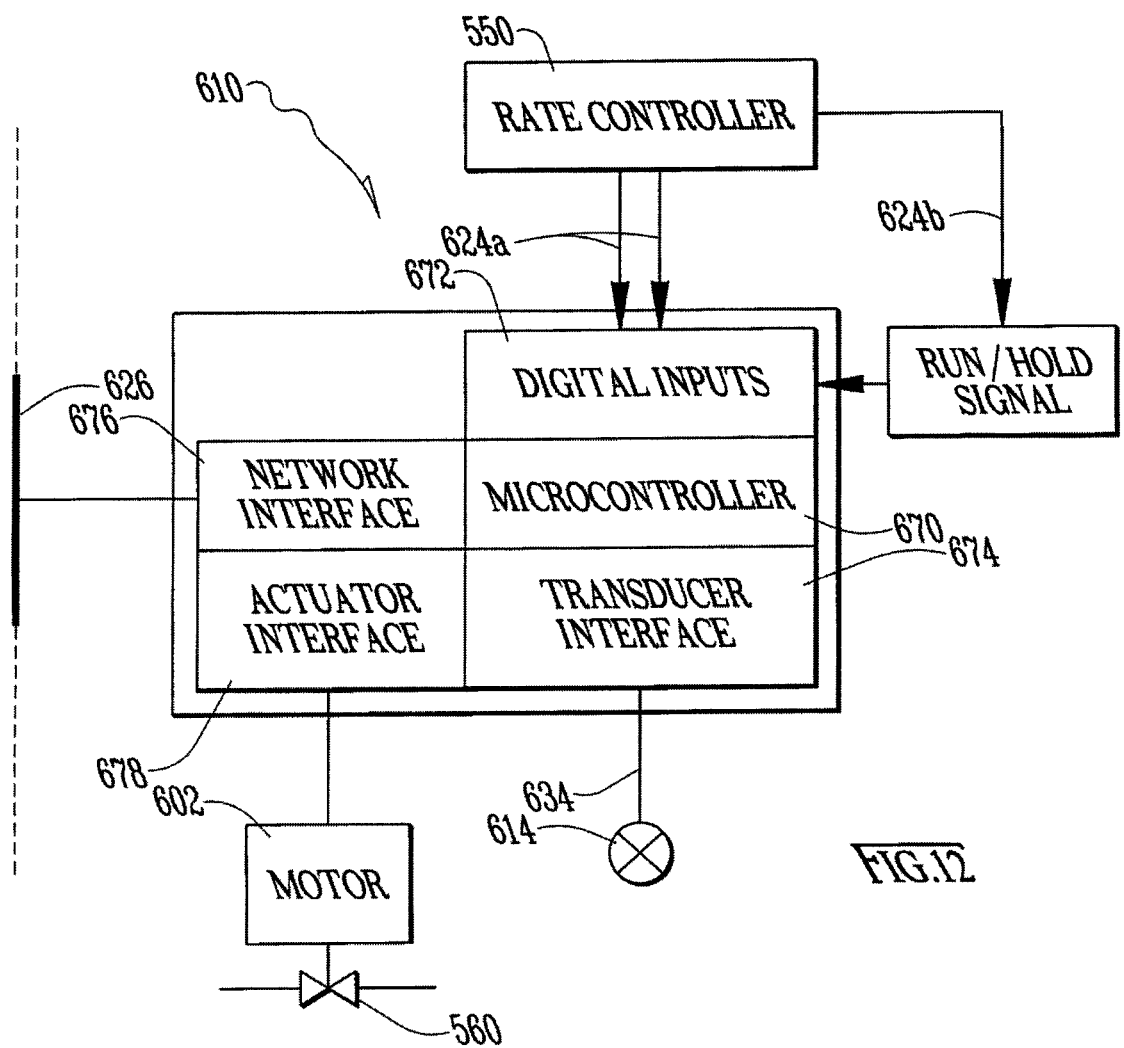
FIG. 12 is a block diagram of exemplary, non-exclusive and non-limiting configuration electronic components preferably incorporated in the control method and apparatus in accordance with the invention.

FIG. 9 is a block diagram of an electro-mechanical (specific) valve control system 610 in accordance with the invention for controlling a specific one of the four (4) multi-port metering valves 560 of FIGS. 1 and/or 8. To turn to FIG. 10, it shows better that each of the (4) multi-port metering valves 560 is provided with its own specific-valve control system 610 and/or 611. As will be described more particularly below, one of the control systems 610 will be given a lead role. The other three control systems 611 will operate largely independently of the "lead" control system 610 in the network as shown in FIG. 10. Preferably, all four (4) control systems 610 and 611 are identical to each other. The assignment of which one is assigned the lead role is somewhat arbitrary. The control system shown in FIGS. 9 and 12 is indicated as reference numeral 610 for convenience, and as representative of all four (4) control systems 610 and 611.

These valve-specific control systems 610-11 execute a closed loop (feedback) control algorithm over the flowrate through the nozzles 540 based on line pressure just downstream from the outlet ports 580-81 of the multi-port metering valves 560.

Needless to say, this control configuration will require a pressure reporting device, such as and without limitation an electronic pressure transducer 614.

Moreover, this control configuration will require numerous communication paths for various devices to communicate with one another. The communication paths can be wireless or optic or about anything, but electric-conducting wire is preferred for economy and convenience. The communication protocols can be about anything too:—changes in current or voltage, or by time-, frequency- or code-divided multiple access telemetry (wherein the latter is known by the acronym CDMA, and is also known as "packet" data).

FIG. 10 shows the following paths:—

1—path 622 between gross flowrate meter 536 and gross flowrate control system 550 (ie., input-to-sys1 path 622);

2—path(s) 624a, 624b between gross flowrate control system 550 and specific-valve control systems 610 and/or 611 (ie., sys1-to-sys2 path 624a or 624b);

3—network path 626 between "lead" specific-valve control system 610 and the other networked specific-valve control systems 611 (ie., network path 626);

4—path 632 between a specific-valve control system 610-11 and a motorized electric actuator for a drive motor 602 (ie., sys2-to-output path 632); and 5—path 634 between a pressure transducer 614 and a specific-valve control system 610-11 (ie., pressure feedback path 634).

To turn back to any of FIGS. 6 through 8, the cultivator 510 (and/or tractor 504) was/were probably equipped with a prior art flowmeter 536 (or in other words, flow reporting device 536) for reporting the gross flowrate of the fertilizer fluid. The cultivator 510 (and/or tractor 504) was/were probably equipped with a prior art a gross flowrate control system 550 which would form and transmit control signals according to the chosen, gross application rate. In the example above, the chosen gross application rate corresponded to two hundred (200) pounds of fertilizer per acre. Resuming in FIGS. 9 and 10, the gross flowrate control system 550 (regardless if prior art or some later-designed technology) forms an outer control loop 636, sending control signals to be acted upon by the four (4) specific-valve control systems 610-11 in accordance with the invention, which form four (4) inner (and parallel) control loops 638.

The gross flowrate control system 550 provides a signal (or set of signals) over sys1-to-sys2 path 624a, which need only be connected to one of the four (4) specific-valve control systems 610-11 in accordance with the invention. In FIG. 10, the one specific-valve control system 610 which is directly connected to the gross flowrate control system 550 is indicated by reference numeral 610. It is considered to be a "lead" control system 610 relative to the other three (3) control systems indicated as 611. But all four (4) specific-valve control systems 610-11 are preferably configured identical to each other. So, as said, whichever one of the four specific-valve control systems 610-11 is given the "lead" role is somewhat of an arbitrary assignment.

All four (4) of the specific-valve control systems 610-11 are networked with each other over network path 626. Hence the input received by the "lead" control system 610 can be readily shared with the other three (3) specific-valve control systems 611.

At some historical time, all four (4) specific-valve control systems 610-11 are idle. Then at some "original" time, the gross flowrate control system 550 outputs a signal that is received by the "lead" specific-valve control system 610.

A typical gross flowrate controller according to the prior art (eg., 550) would provide the sole prior art regulating valve 544 (refer back to, eg., FIG. 6) with control signals from which can be derived three types of information:—

1—whether the sole regulating valve 544 is to be CLOSED or OPEN;

2—if OPEN, whether the regulating valve 544 is to make a valve adjustment corresponding either to INCREASING or DECREASING the flowrate; and 3—a signal corresponding to the MAGNITUDE of the adjustment (eg., a lot or a little).

So at this "original" time, the "lead" specific-valve control system 610 receives the OPEN signal, the INCREASE signal and MAGNITUDE signal. From these inputs, the "lead" specific-valve control system 610 computes a target line pressure for all thirty-two (32) outlet ports.

Say for example, the flowrate had been zero (0) before this "original" time. The gross flowrate control system 550 receives user input from the farmer (the driver of the tractor 504) corresponding to a gross application rate (eg., 200 pounds per acre in the example above). The gross flowrate control system 550 computes a set of signals. These set of signals are intended to be sent to, and received and acted upon by a sole, prior art regulating valve 544 (as shown in FIG. 6) in an iterative control process that would ultimately stabilize on the target application rate.

Here in FIGS. 9, 10 and 12, the signal(s) from the gross flowrate control system 550 have been re-purposed to, and received and acted upon by the network of specific-valve control systems 610-11. The "lead" specific-valve control systems 610 computes an "initial" target line pressure for each of the thirty-two (32) outlet ports 580. Let's say, for sake of example and without limitation, the "initial" target line pressure is computed to be twenty (20) psig. The "lead" control system 610 communicates that computed target line pressure of twenty (20) psig to the other three (3) specific-valve control systems 611.

Each one of the specific-valve control systems 610-11 should be able to settle fairly well down on the target twenty (20) psig line pressure within two or three seconds.

Now let's say in our example, that the outer control loop (eg., the prior art gross flowrate controller 550) determines that insufficient flowrate is flowing to reach the chosen application rate. It will thereafter send a new set of control signals to the "lead" specific-valve control system 610. These might consist of a (remain) OPEN signal, a (stay on) the INCREASE signal, and a revised-upward with the MAGNITUDE signal.

From these new inputs, the "lead" specific-valve control system 610 re-computes a new target line pressure for all thirty-two (32) outlet ports 580. Say for example, the new target line pressure is computed to be thirty (30) psig. The "lead" control system 610 communicates that computed new target line pressure of thirty (30) psig to the other three (3) specific-valve control systems 611.

Each one of the specific-valve control systems 610-11 should be able to settle fairly well down on the target thirty (30) psig within less than a second.

Furthermore, let's say for the sake of simplicity, that the thirty (30) psig target line pressure is indeed the magic number. The outer control loop (eg., the prior art gross flowrate controller 550) will not send anymore control signals as long as it determines that the flowrate is sufficient. Each of the four (4) specific-valve control systems 610-611 will be independently laboring away at holding the target line pressure at thirty (30) psig.

As an aside, it has been observed by the inventor hereof that, adjusting the rotational adjustment dial 576 by just one arc degree (1° arc) can change line pressure at the outlet ports 580 by more than one (1) psi.

FIG. 9 shows the closed loop (or feedback) control configuration of the "lead" control system 610, and as representative of the other three (3) control systems 611. The closed loop has a pressure transducer 614 mounted to the bowl-shaped body 572 of the valve 560 to provide a signal corresponding to line pressure in one of the outlet ports 580. Alternatively, the pressure transducer 614 can be plumbed by a T-fitting at the inlet end of one of the lines 608 of row tubing. The pressure signal is fed back to the specific-valve control system 610.

Pause can be taken to explain what follows. There will be a little review of what has just been described, perhaps in alternative terminology, but eventually increasing in detail. In other words, the following has been authored from a different perspective.

Each specific-valve control system 610 or 611 uses an electronic pressure transducer 614 to measure the upstream back pressure developed on row tubing lines 608 due to fertilizer fluid flow through the row tubing, and ultimately dispensing through the nozzles 540. All the row tubing lines 608 are preferably of equal lengths (and equal diameter and same materials). Fertilizer fluid flows from the gross flowrate flowmeter 536 to the multi-port metering valves 560 through a delivery network of hoses or hard conduits 642 and splitters 644. This delivery network 642,644 is characterized by very large line diameters such that there is little pressure drop in the delivery network 642,644 from the gross flowrate flowmeter 536. The main reason for wanting little pressure loss is that, it is hoped that the ultimate spray dispensing out of the spray nozzles 540 is achieved without needing (or with needing only a rather low-power) booster pump to boost line pressure. That is, if designed well, this mobile tank fertilization system 502 in accordance with the invention may be driven by tank pressure alone of the supply tanks 514.

The flow reporting device 536 typically comprises a turbine-type flowmeter. For reliable flow measurement, the fertilizer fluid flowing into the flowmeter 536 is conditioned by the conditioning system 534 to eliminate vapor from, and perhaps filter and pressurize the fertilizer fluid. Fertilizer fluid flows from the tank(s) 514 to the liquid conditioning system 534 through a main feeding conduit or hose 532. The fertilizer fluid application rate is typically controlled by a prior art gross flowrate control system 550 that may be mounted in the cab of the tractor 504 or on the toolbar 520. The fanner sets the operating parameters for the gross flowrate control system 550 using and operator interface (eg., keypad or touch screen, not shown), which may be a separate or combined entity with the gross flowrate control system 550.

FIG. 9 shows the various functional interconnects of a specific-valve control system 610 for controlling one of the four (4) multi-port metering valves 560. The specific-valve control system 610 sends a control voltage across sys2-to-output path 632 to motorized electric actuator of the drive motor 602. Sys2-to-output path 632 includes power, ground and the two standard rate controller control signals (eg., as generated by controller 550):—flow INCREASE and flow DECREASE. The motor actuator refers to a package of equipment comprising a drive motor 602, reduction gearing, an arrangement of limit switches that limits motion to not exceed fully OPEN or fully CLOSED, and so on. The motor actuator (eg., 602) varies the effective aperture size of the entire set of outlet ports 580 included in the multi-port metering valves 560. The effective aperture size for each outlet port 580 (excluding the ninth one 581, which is the half-flowrate option) should be equal for all the outlet ports 580 of the multi-port metering valve 560.

One or more electronic pressure transducers 614 provide a control feedback signal (or signals) to coordinate the pressure equalization among the multiplicity of outlet ports of the multi-port metering valve 560.

The electronic pressure transducer 614 measures line pressure in one or more of the row tubing lines 608 somewhere close to one or more of the multiplicity of outlet ports 580 in the multi-port metering valve 560. Wherever the line pressure is measured, it should correspond by some factor to line pressure at the spray nozzle 540 and hence fluid dispensing rate at each nozzle 540. Each pressure transducer 614 relays pressure information through pressure feedback path 634 in any form of voltage, current, digital information and the like. Additional pressure transducers 614 are added to each single multi-port metering valve 560 for redundancy—perhaps one transducer 614 on each row-tubing line 608—and maybe to enable individual nozzle 540 shut off. One example of this will be described more particularly below in connection with FIG. 7.

In a preferred embodiment of the invention, the communication of information among the plurality of multi-port metering valves 560 is done over network path 626, which chiefly shares the output pressures of the multi-port metering valves 560 among the respective specific-valve control systems 610-11 therefor. Communicated pressures and other status information are pooled for collective control computations that may take place in any or all control units 610-11. At least one of the networked, specific-valve control system 610 receives the gross rate controller 550 flow control signal through sys1-to-sys2 path 624a. This specific-valve control system 610 is preferably albeit arbitrarily assigned a "lead" role among the network of specific-valve control systems 610-11. This "lead" specific-valve control system 610 receives various signals corresponding to:—

1—(all) ON, (all) OFF, or some ON and some OFF;
2—INCREASE flowrate, DECREASE flowrate, or HOLD (steady); and
3—if INCREASE or DECREASE flowrate, then by what MAGNITUDE.

FIG. 7 shows a configuration of a mobile tank fertilization system 502 in accordance with the invention that comprises for example and without limitation, thirty-two (32) spray nozzles 540, each with a dedicated regulating valve 544 and a dedicated electronic pressure transducer 614 measuring the line pressure between that nozzle 540 and its dedicated regulating valve 544:—as well as, a dedicated specific-valve control system 610 and/or 611 in accordance with the invention. Each regulating valve 544 is controlled by a dedicated control system 610 and/or 611 to hold the back pressure on the nozzle 540 to a target line pressure shared by all thirty-two (32) control systems 610 and/or 611 to maintain equal pressure and thereby equal dispensing flowrate per nozzle. Or otherwise coordinate information among the thirty-two (32) control systems 610 and/or 611 to achieve different effects, like:— the outboard-most two nozzles 540 spray at a "halved" flowrate;
differential ON or OFF instructions, and/or
any other specific control for an individual nozzle 540.

In FIG. 8, it can be reckoned that there are four (4) sub-divisions of nozzles 540, or groups of eight or nine (8 or 9) nozzles 540, which sub-divisions or groups can be turned ON and OFF independently of each. Again, each sub-division comprises a group of up to nine (9) nozzles 540 apiece (eight nozzles 540 apiece is illustrated). FIG. 7 shows an improvement over that in one manner. That is, in FIG. 7, each nozzle 540 (which is provided with a dedicated pressure transducer 614, a dedicated regulating valve 544, and a dedicated control system 610 and/or 611) is a sub-division unto its own. In FIG. 7, each valve 544 can be independently switched from ON to OFF (and vice versa), while all the ones remaining ON are held to maintaining a target pressure (eg., 30 psig) (or a fraction thereof).

In use, the FIG. 7 arrangement allows the following. The farmer can be towing the cultivator 510 to the end of a pass in the field, except where the boundary of the cultivated part of the field runs at a diagonal to the farmer's straight-line course (say, for example forty-five arc degrees, or 45° arc). The farmer can initiate a signal across the network of the thirty-two (32) specific-valve control systems 610 and/or 611 in FIG. 7 whereby each valve 544 switches to OFF as it crosses-over the boundary of the cultivated part of the field. In other words, the thirty-two (32) valves 544 as shown in FIG. 7 would serially shut OFF from one lateral outboard extreme to the other, as the cultivator 510 is pulled across the diagonal boundary.

FIG. 10 shows an example of a network comprising as an example of four (4) specific-valve control systems 610-11, each one being dedicated to and responsible for one each of four (4) multi-port metering valves 560. Preferably, the control functions are distributed among four (4) independent control systems 610-11 (albeit sharing communications among one another). Alternatively, the control functions instead might be centralized in a single control system (eg., a "lead" control system 610 that controls all four (4) multi-port metering valves 560 units illustrated in FIG. 10). Nevertheless, in the preferred embodiment, there is a specific-valve control system 610 or 611 for each valve 560. Each control system 610-11 is connected to at least one electronic pressure transducer 614 sampling a line pressure measured somewhere between the outlet port 580 and/or 581 in the metering valve 560 and the nozzle 540 (for convenience sake, taking the measurement closer to the outlet port 580 and/or 581 is preferred). Additional pressure transducers 614 may be added such that each row tubing line 608 has its pressure measured and reported. Among other benefits, the foregoing would allow a configuration like FIG. 7 where there is the flexibility to selectively shut OFF fertilizer fluid flow at each individual nozzle 540.

The multi-port metering valves 560 shown in FIG. 10 are fed fertilizer fluid through a fluid delivery network 642,644 that is typically split using any kind of fluid splitting 644 or manifold devices.

A gross flowrate reporting device 536 reports the gross fertilizer fluid flow out of the supply tank(s) 514 to the gross flowrate control system 550. Such (gross flowrate) control systems 550 typically sample other information/data as well such as (a) user input of desired application rate (eg., 200 pounds per acre) and/or (b) the speed of the tractor 504 (eg, as taken from a travel speed reporting system) to account for towing speed in the computations of gross flowrate of the fertilizer fluid in order to meet the chosen application rate.

From the perspective of the gross flowrate control system 550, the plurality of specific-valve control systems 610-11 are controlled no differently than if the receiver of gross flowrate control system 550's control signals was a single regulating valve 544, including those of the prior art (for 544, see eg., FIG. 6). Regardless if the receiver of the control signals is a single regulating valve 544 or else a network of specific-valve control systems 610-11, the signals are sent across the sys1-to-sys2 path 624a according to the same protocol as for regulating valve 544.

Again, the signal protocol traveling across the sys1-to-sys2 path 624a between the gross flowrate control system 550 in accordance with the prior art and the network of specific-valve control systems 610-11 in accordance with the invention is identical in number and types of control signals sent/received as in the case of a single regulation valve 544 in accordance with the prior art.

This signal protocol in accordance with the prior art typically comprised three signal wires:—

1—one wire being a common ground for the next two;
2—a second wire which, if carrying a signal, corresponds to the INCREASE instruction, and moreover, the pulse width of which signal corresponds to the MAGNITUDE instruction; and
3—a third wire which, if carrying a signal, corresponds to the DECREASE instruction, and moreover, where the pulse width of this signal likewise corresponds to the MAGNITUDE instruction.

Each specific-valve control system 610-11 is provided with computational (eg., logic execution) functionality as well as memory and connectors/components for device-to-device communications. The program logic can be stored in firmware or software and so on.

Figure 11:
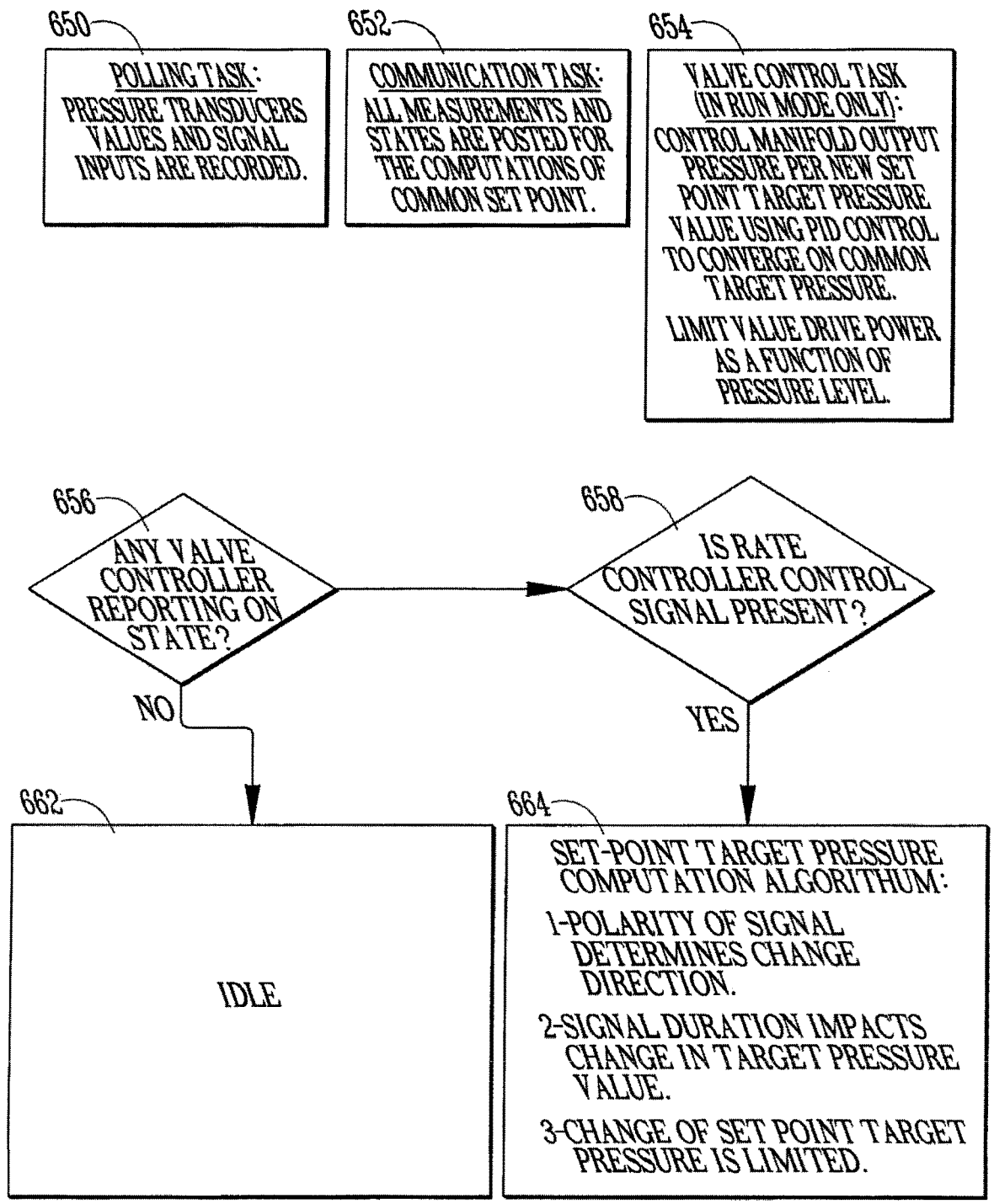
FIG. 11 is a block diagram and flow chart diagram of an algorithm that coordinates the control and operations of controllers in accordance with the invention.

FIG. 11 provides an overview of the control logic. Tasks 650, 652 and 654 are scheduled to run repeatedly during operation of the respectively controlled multi-port metering valves 560. The run time frequency for tasks 650, 652 and 654 are in the order of a hundred times per second or more, up to thousands of time per second.

Polling task 650 polls the line pressure measured by the electronic back pressure transducer 614 by means of pressure feedback path 634 and receives the newest or has stored the last signals from the gross flowrate control system 550 received over sys1-to-sys2 path 624*a*.

The information communication task 652 communicates the status information of each multi-port metering valve 560 (as reported by its dedicated specific-valve control system 610-11) to a central information pool. Preferably, this central information pool resides in "lead" specific-valve control system 610. Network communication among the four (4) specific-valve control systems 610-11, in the preferred embodiment, is preferably accomplished through serial transmissions of packets of information. While each specific-valve control system 610-11 is completing its independent closed-loop execution rate on the order of hundreds to thousands of times per second, the inter-network sharing of status preferably runs at frequencies of dozens of times per second (or less).

The equalizing control task 654 actuates the motor actuators that drive motor 602 to adjust the multi-port metering valves 560 to yield a run pressure to match the computed target pressure. The run pressure is measured by pressure transducer 614.

Logical decision 656 has the "lead" specific-valve control system 610 reading whether the "RUN" signal is present. If yes, then branch to the "RUN MODE." If no, then branch to process block 662, ie., valve shut OFF state 405.

In valve shut OFF state 662, also referred to as "hold mode," the flow of fertilizer fluid has been switched OFF, possibly by the gross flowrate controller 550, by some main upline valve on the main feeding conduit or hose(s) 532 (such valve not shown). Various signals can produce a situation where the specific-valve control systems 610-11 drive their respective multi-port metering valves 560 to an (or a fully) OPEN position to release all upline fertilizer fluid, until a reversal of the control signal changes the control instruction.

Again, each specific-valve control system 610-11 can be switched between an ON mode (eg., run mode) and an OFF mode (hold mode) as a result of incoming command signal(s) originating from the gross flowrate control system 550 (perhaps these can be overridden by farmer-controlled manual inputs).

Returning to logical decision 656, if it is yes, then it leads to logical decision 658, whether a signal from the gross flowrate controller 550 is present. If the "RUN" signal is present, then there should also be present a control signal from the gross flowrate controller 550.

The "yes" state of "RUN MODE" decision 658 is a state where the control over adjusting the effective sizes of outlets 580-81 of the multi-port metering valves 560 serve as an inner control loop 638 vis-a-vis controllers 610-11, but whereby under the control of the outer control loop 636 controlled by the gross flowrate control system 550 control.

In this mode, the common algorithm for each of the "lead" specific-valve control systems 610-11 compute(s) a common target pressure for each one's multi-port metering valve 560, using both collected (and shared) state information of each of the multi-port metering valves 560.

Process block 664 comprises the computational or "set point" algorithm to revise a common target pressure. The "set point" algorithm 664 takes into consideration (a) the "direction" and (b) the "length" (pulse width) of the control signal from the gross flowrate control system 550. "Direction" as defined here corresponds reversibly between an INCREASE flow signal or a DECREASE flow signal. Whereas the direction of change is a Boolean instruction (ie., INCREASE or DECREASE), a linear computation is adequate for computing the 'magnitude' of change of target pressure based on incoming signal duration (eg., pulse width).

Stability of specific-valve control systems 610-11 is improved if there are imposed limits on the change of the target pressure, despite what is computed. If the computed new target is outside the limit for change between and the preceding target and the new computed target, the limit is chosen over the new computed target.

This limit prevents the new target pressure from swinging too far from the operating (run) pressure of any given multi-port metering valves 560. This limit varies as a function of the present operating line pressure values of the plurality of operating valves 560. Control algorithm 664 limits the target pressure change from exceeding a given difference in pressure (eg., a maximum of 5 psi of pressure difference to any given measured line pressure in a row tubing line 608). This limit varies as a limited linear function of the average operating back pressure for the plurality of multi-port metering valves 560. The lower the operating back pressure, then smaller is the computed limit. A practical linear limit range for fertilizer fluid application using 15 foot long, 0.5 inch diameter row tubing is from 2 psi to 10 psi limit for an operating average pressure from 5 psi to 100 psi.

The following is an example to illustrate the computations of limits to target pressure computational swings using an example of practical limits given above:—The operating average pressure of multi-port metering valves 560 is 40 psig. The maximum allowable change in target pressure is computed by algorithm as:—

$$\text{Max allowable change for target pressure} = (40/100)*(10-2)+2, \text{ or } =5.2 \text{ psi [eg., when operating near 40 psig]}. \quad (1)$$

Attention can be returned to the equalizing control task 654. Process block 664 computes the set-point target pressure. In contrast, equalizing control task 654 steps through a "Proportional-Integral-Derivative" (ie., hereinafter "PID") control algorithm to equalize multi-port metering valves 560 row pressures. Indeed, the pressure equalization control task 654 performs PID computations independently from target pressure set point calculations process block 664 as follows:

1—multi-port metering valves 560 average output pressure measurement is compared to the common set point target pressure. The result of this comparison is commonly referred to as the "error." In the case of single pressure transducer 614 per multi-port metering valves 560, the average measurement is the singular output pressure reading.

2—A drive power level is computed through a standard PID algorithm with the computed "error" value mentioned above as an input to the PID computations.

3—It is appreciated that the PID computation algorithm uses the output pressure level as a factor in limiting the computed valve drive power level. Computing the valve drive level limit as proportional function of the measured multi-port metering valves 560 pressure output provides further aperture control stability while effective flow aperture 580 and/or 581 is operating near the fully closed extreme. In part this is done by limiting the motor actuator speed. Conversely, relaxing the maximum limit improves response time when effective flow aperture is near the fully open extreme by increasing valve motor actuator drive power (and/or speed).

The rotational adjusting dial 576 of any of the multi-port metering valves 560 is moved and positioned by the drive motor 602 under the control of a control loop programmed into the respective valve-specific control system 610 and/or 611. Forward and reverse power are applied to the electric motor 602 to rotate the adjusting dial accordingly.

The pressure measured by the pressure transducer 614 is called the "process variable" (PV). The target pressure is called the "setpoint" (SP). The output to the electric motor (eg., electric current) will be called here the "control_output (t)."

The difference between the pressure measured by the pressure transducer 614 (which again is the (PV)) and the target pressure (ie., the "setpoint") is the "error" (e).

The "error" (e) quantifies whether the rotational adjusting dial is (a) too far clockwise or (b) too far counter-clockwise, and, (c) by how much.

The PID control scheme is named after its three correcting terms, whose sum constitutes the output (ie., the "control_output(t)") for the control system(s) 610 or 611. The first term is the "proportional" term:—this is the factional amount the motor current is set in proportion to the existing error (e).

The second term is the "integral" term:—this is the fractional amount which the motor current is set by small persistent steps that, while proportional to the current error (e) like above, are accumulated and add up dependent on past errors (e). This the discrete-time equivalent to integration.

The third term is the "derivative" term:—this is the fractional amount which the motor current is set by the rate of change of error (e), supplying more or less electric current depending on how fast the error (e) is approaching zero.

The final form of the PID algorithm is:

$$\text{control\_output}(t) = K_p e(t) + K_i \int_0^t e(\tau) d\tau + K_d \frac{de(t)}{dt} \quad (2)$$

where
- $K_p$: Proportional gain, a tuning parameter
- $K_i$: Integral gain, a tuning parameter
- $K_d$: Derivative gain, a tuning parameter
- e: Error SP−PV
- SP: Set Point
- PV: Process Variable
- t: Time or instantaneous tide (the pre
- τ: Variable of integration; takes on values from time 0 to the present t.

A simple example of P.I.D. code is as follows.

set:
    get (setpoint, dt, Kp, Ki, Kd)
    previous_error=0
    integral=0
start:
    get (measured_value, reset_flag)
    error=setpoint−measured_value
    integral=integral+error*dt
    derivative=(error−previous_error)/dt
    control_output=Kp*error+Ki*integral+Kd*derivative
    previous_error=error
    wait (dt)
    If (reset_flag=YES (ie., and not NO)):
        then go back to set
        else go back to start Applying too large of a correction when the error (e) is small—or as has been discovered by the inventor(s) hereof, when the target pressure is low—will lead to overshoot, and perhaps too large correction in the opposite direction, and so on, leading to oscillations and even worse, non-decaying instability. However, the matter of putting limits on the correction has been discussed above in part, in connection with Equation (1).

FIG. 12 is a block diagram of the electronic services needed to construct a specific-valve control system 610 and/or 611 in accordance with a preferred embodiment of the invention (610 is shown for convenience and as representative of equivalent control systems 611).

In FIG. 12, a specific-valve control system 610 in accordance with the invention comprises electronic micro-controller based system. The following further specifications will serve to achieve valve control as described in above. That is, a specific-valve control system 610 in accordance with the invention preferably can be made up of the following:—

A micro-controller 670 with preferably a program code capacity of one-hundred twenty eight kilobytes (128K bytes) of program memory space and sixteen kilobytes (16K bytes) of general purpose memory space. The micro-controller 670's CPU speed is preferably capable of achieving a minimum of ten million computations per second. A minimum of three (3) discrete digital inputs are needed; two (2) inputs 624*a* are needed for rate control interface 676 with the gross flowrate control system 550. A third (3rd) signal connection 624*b* is needed for run/hold mode control signal, which is connected to all the specific-valve control systems 610, 611 on the network. A minimum of one pressure transducer interface 674 configured to be compatible with pressure transducer 614. The analog-to-digital conversion is preferred to be capable of a minimum resolution of ten bits (10-bits) and a minimum conversion speed in the order of one millisecond. A network interface 676 with a minimum speed of one-hundred fifty kilobits (150K bits) per second is adequate as a medium for specific-valve control systems 610-11 units to communicate over a network bus or cable network in the form of RS485 or CANbus (eg., network path 626) or similar network interface standard. Additionally, the control system 610 will need to be configured with an output interface 507 for sending control signals to the actuator driving the drive motor 602.

Depending on the operating voltage of the micro-controller 670 in use, voltage level driver interface circuits may be needed to (needless to say) successfully interface between devices of disparate interface protocols.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A method of controlling multi-nozzle fluid dispensing for mobile tank fertilization of row-crop fields; comprising the steps of: towing a multiplicity of laterally-spaced nozzles; towing a bulk supply of fertilizer fluid; dividing the multiplicity of nozzles into a plurality of sets; providing a plurality of metering valves and a plurality of controllers; associating one each of the plurality of metering valves and one each of the plurality of controllers with one each of the plurality of sets of nozzles wherein each of the plurality of metering valves meters a through-flow of fertilizer fluid distributed thereto from the bulk supply and out through a specific row-tubing line for each respective nozzle of the multiplicity of nozzles in a set of the plurality of sets, and each of the plurality of controllers serves adjustment communications to the respective metering valve; each of the plurality of controllers acquiring a measurement of back pressure intermediate the associated metering valve and at least one associated nozzle of the associated set therefor, and then evaluating the back pressure measurement, and thereafter sending an adjustment communication to the associated metering valve based on said evaluation, corresponding to adjusting a change or not; measuring a towspeed of the multiplicity of nozzles; accessing from memory or a communication information corresponding to a nozzle array geometry, and information corresponding to a target gross application rate; evaluating the tow speed, the nozzle array geometry, and the target gross application rate, and in view of the tow speed, the nozzle array geometry, and the target gross application rate determining a change to or not of a gross outflow rate target; propagating the gross outflow rate target among the plurality of controllers; each of the plurality of controllers evaluating the measurement of back pressure for the metering valve associated therewith, and adjusting a change or not to the associated metering valve based on said evaluation.

2. A method of controlling multi-nozzle fluid dispensing for mobile tank fertilization of row-crop fields; comprising the steps of: towing a multiplicity of laterally-spaced nozzles; towing a bulk supply of fertilizer fluid; dividing the multiplicity of nozzles into a plurality of sets; providing a plurality of metering valves and a plurality of controllers; associating one each of the plurality of metering valves and one each of the plurality of controllers with one each of the plurality of sets of nozzles wherein each of the plurality of metering valves meters a through-flow of fertilizer fluid distributed thereto from the bulk supply and out through a specific row-tubing line for each respective nozzle of the multiplicity of nozzles in a set of the plurality of sets, and each of the plurality of controllers serves adjustment communications to the respective metering valve; each of the plurality of controllers acquiring a measurement of back pressure intermediate the associated metering valve and at least one associated nozzle of the associated set therefor, and then evaluating the back pressure measurement, and thereafter sending an adjustment communication to the associated metering valve based on said evaluation, corresponding to adjusting a change or not; wherein one of the plurality of metering valves comprises X ports and wherein X-Y ports of the X ports are plumbed by X-Y specific row-tubing lines to X-Y nozzles of the respective set of nozzles for the respective one metering valve, where X and Y are integers and $0<Y<X$.

3. A method of controlling multi-nozzle fluid dispensing for mobile tank fertilization of row-crop fields; comprising the steps of: towing a multiplicity of laterally-spaced nozzles; towing a bulk supply of fertilizer fluid; dividing the multiplicity of nozzles into a plurality of sets; providing a plurality of metering valves and a plurality of controllers; associating one each of the plurality of metering valves and one each of the plurality of controllers with one each of the plurality of sets of nozzles wherein each of the plurality of metering valves meters a through-flow of fertilizer fluid distributed thereto from the bulk supply and out through a specific row-tubing line for each respective nozzle of the multiplicity of nozzles in a set of the plurality of sets, and each of the plurality of controllers serves adjustment communications to the respective metering valve; each of the plurality of controllers acquiring a measurement of back pressure intermediate the associated metering valve and at least one associated nozzle of the associated set therefor, and then evaluating the back pressure measurement, and thereafter sending an adjustment communication to the associated metering valve based on said evaluation, corresponding to adjusting a change or not; providing an outer controller to evaluate information accessed from memory and/or acquired across a communication path corresponding to a nozzle land-traverse speed, a target gross coverage rate for the fertilizer fluid, and a nozzle array geometry; said outer controller thereafter creating a communication corresponding to a per-nozzle dispensing rate; providing the plurality of controllers for each metering valve with the information accessed from memory and/or acquired across a communication path corresponding to a per-nozzle dispensing rate and a back pressure between the valve and its nozzles; said plurality of controllers thereafter creating a communication corresponding to a change in adjustment or not for each respective metering valve of the plurality of metering valves.

4. A method of controlling multi-nozzle fluid dispensing for mobile tank fertilization of row-crop fields; comprising the steps of: towing a multiplicity of laterally-spaced nozzles; towing a bulk supply of fertilizer fluid; dividing the multiplicity of nozzles into a plurality of sets; providing a plurality of metering valves and a plurality of controllers; associating one each of the plurality of metering valves and one each of the plurality of controllers with one each of the plurality of sets of nozzles wherein each of the plurality of metering valves meters a through-flow of fertilizer fluid distributed thereto from the bulk supply and out through a specific row-tubing line for each respective nozzle of the multiplicity of nozzles in a set of the plurality of sets, and each of the plurality of controllers serves adjustment communications to the respective metering valve; each of the plurality of controllers acquiring a measurement of back pressure intermediate the associated metering valve and at least one associated nozzle of the associated set therefor, and then evaluating the back pressure measurement, and thereafter sending an adjustment communication to the associated metering valve based on said evaluation, corresponding to adjusting a change or not wherein the step of each of the plurality of controllers evaluating the measurement of back pressure for each of the plurality of metering valves associated therewith, and adjusting a change or not to each of the plurality of metering valves based on said evaluation, further comprises: configuring the row-tubing lines to be of equal flow resistance at equal pressure; adjusting each of the plurality of metering valves for there to be equal pressure among all the row-tubing lines at an equal benchmark away from the associated metering valve, whereby the back pressure at each nozzle of the plurality of sets of nozzles for the associated metering valve of the plurality of metering valves is substantially equalized across the plurality of sets of nozzles.

5. The method of controlling multi-nozzle fluid dispensing for mobile tank fertilization of row-crop fields according to claim 4, wherein:

the measurement of back pressure is substantially equalized across the multiplicity of nozzles.

6. The method of controlling multi-nozzle fluid dispensing for mobile tank fertilization of row-crop fields according to claim 4, further comprising the steps of: providing an outer controller in communication with the multiplicity of controllers to periodically propagate a communication corresponding to either a gross application of fertilizer fluid or a target pro-rata dispensing rate for each of the multiplicity nozzles to achieve a substantially equalized dispensing flow rate for each of the plurality of nozzles.

\* \* \* \* \*